Jan. 9, 1940.　　　T. C. FOCKLER ET AL　　　2,186,240
BRUSH HOLDER
Filed Feb. 17, 1938　　　3 Sheets-Sheet 1
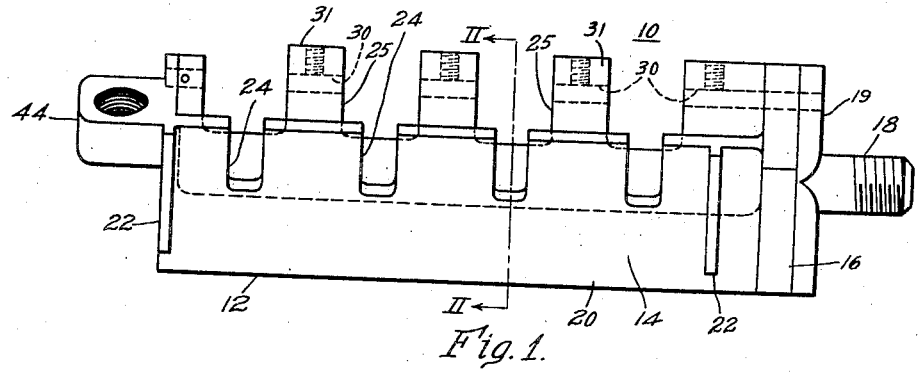
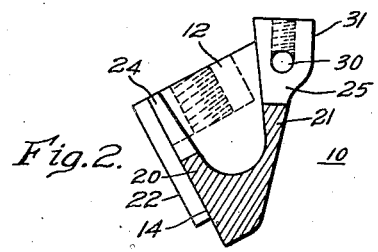
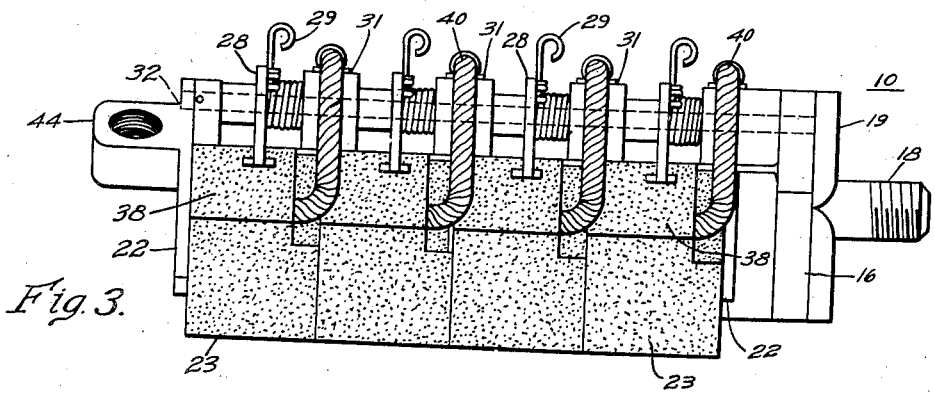
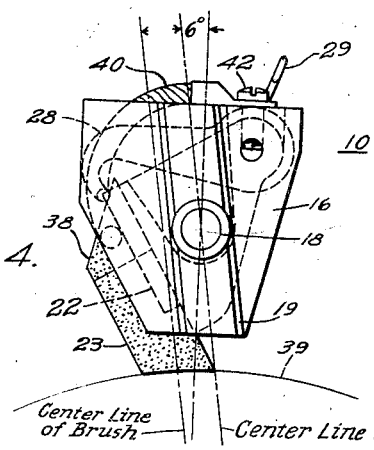
INVENTORS
Theodore C. Fockler &
Albert Martens.
BY
ATTORNEY

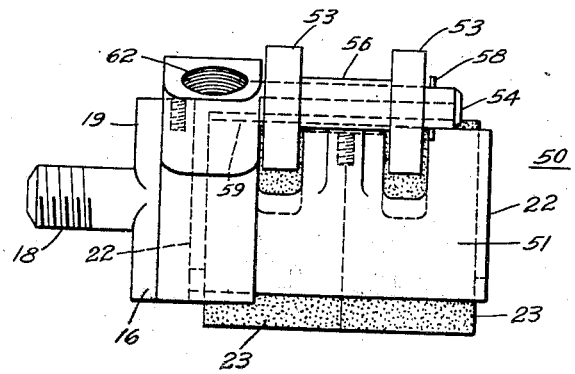
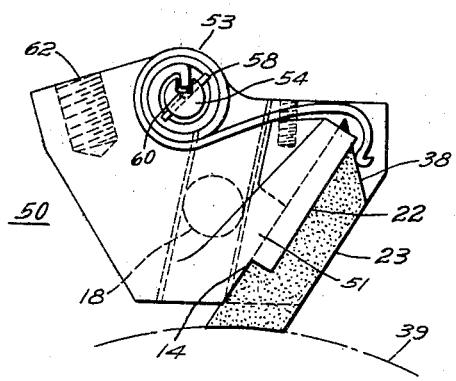

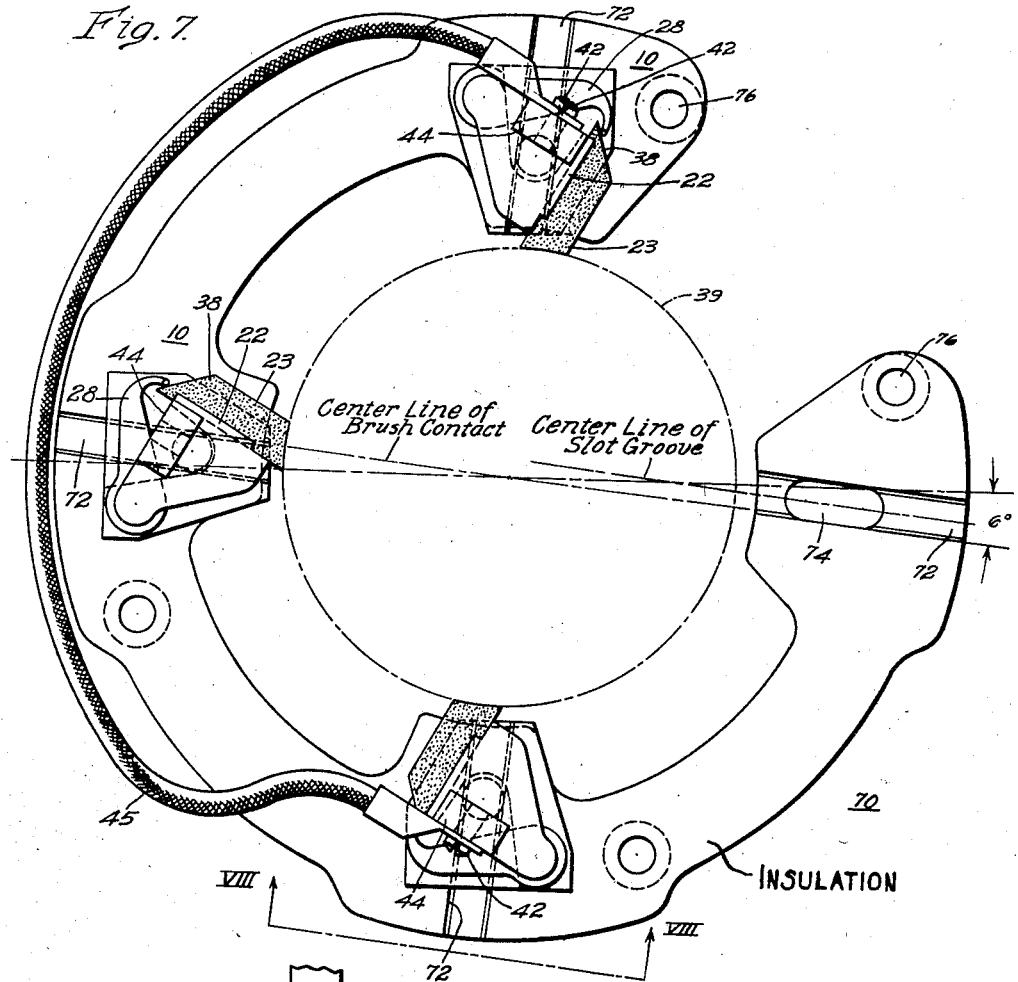
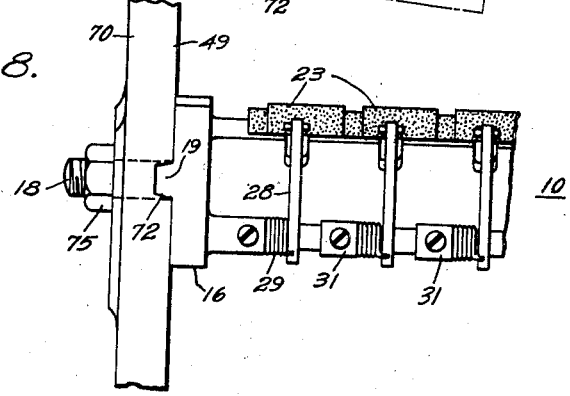

Patented Jan. 9, 1940

2,186,240

UNITED STATES PATENT OFFICE

2,186,240

BRUSH HOLDER

Theodore C. Fockler, Wilkinsburg, and Albert Martens, Murrysville, Pa., assignors to Westinghouse Electric & Manufacturing Company, East Pittsburgh, Pa., a corporation of Pennsylvania Application February 17, 1938, Serial No. 191,010

11 Claims. (Cl. 171—324)

Our invention refers, generally, to brush holders, and it has particular reference to an improved brush holder for use with dynamo-electric machines.

In the manufacture of brush holders for dynamo-electric machines, many difficulties are encountered. Since an important requirement of a brush holder is that it readily permit relative movement of the brush in the holder to compensate for irregularities in the surface of the commutator, it is important that all surfaces of the brush holder which are in contact with the brush be sufficiently smooth, and that the brush fit accurately in the holder. With most designs of brush holders and methods of manufacturing them, this requires a multiplicity of machining operations on the brush holder surfaces, and maintenance of the brush dimensions within limited tolerances. Even where these precautions are observed it is not uncommon for subsequent corrosion of a brush holder to cause pitting of the machined surfaces, which leads to "freezing" of the brush in the holder, thus preventing it from making satisfactory contact with the commutator or collector ring.

Inasmuch as it is usually desirable to have the brush holder body carry a large part of the current collected by the brushes, it is essential that the holder be made of a metal having relatively high conductivity. This requirement greatly limits the choice of materials which may be used. Brass, which would be a desirable material because of its relatively high conductivity and strength, cannot be economically used in the usual methods of manufacture. If it is cast, the surfaces of the brush holder must necessarily be machined to make them sufficiently smooth, and if a pressed construction is used, the holder must be made in several parts and riveted, and a broaching operation of the assembled brush holder performed to secure a sufficiently accurate brush fit. These operations mean additional time and labor, and therefore add greatly to the expense of manufacturing. Zinc alloys that are readily adaptable to production methods, such as die-casting, have the disadvantage of being particularly susceptible to corrosion and electrolysis which in time pit the surfaces of the holder and prevent a free movement of the brush therein.

Accordingly, it may be seen that any design of brush holder which will be readily adaptable to mass production methods and will not have the disadvantages of many of the present types of brush holder, will fill a marked need in the industry. And where such design is not only adaptable to mass production methods, but is also inexpensive to produce and is easily assembled and adjusted, it will be realized that it is a decided improvement over brush holders of the prior art.

Moreover, where a multiplicity of brushes are to be used in parallel on a dynamo-electric machine, and where the usual type of brush holder, which is clamped about a support stud, is used, serious disadvantages arise. It has been found that in many types of present-day dynamo-electric machines, accurate positioning of the brushes on the commutator is essential. This is particularly true with dynamo-electric machines of the cross-field type where slight differences in the relative position of parallel brushes on the commutator result in "selective commutation", whereby one brush of a group being out of alignment carries much more than its proper share of the load. Highly undesirable circulating currents may also occur in the armature windings because of misalignment of the brushes, resulting in decidedly poor commutation, which causes rapid wear of the brushes and commutator, and renders the machine unstable under heavy loads.

Furthermore, with the usual type of brush holder, subsequent adjustments of the holder to compensate for reduction in commutator diameter through wear and machining of the commutator to resurface it will result in a shifting of the electrical center of the brush on the commutator surface. This is particularly so with brush holders wherein an extended holder support arm is clamped about a support stud at some distance from the brush. If adjustment of the holder is made about this support stud, the brush moves along the arc of a circle and its electrical center of contact with the commutator will therefore shift along the circumference of the commutator when the brush holder is adjusted to compensate for any decrease in the commutator diameter. Likewise, with reaction type brush holders wherein the brush must be maintained at an oblique angle to the surface of the commutator for the holder to function properly, wear of the commutator will result in a gradual shift of the electrical center of the brush contact with the commutator as the brush slides further down in the holder, thus greatly impairing the commutating characteristics of the machine. Inasmuch as generators of the cross-field type, though having highly desirable load characteristics, are peculiarly sensitive to changes of the center of brush contact and misalignment of brushes, principally because of the normally short circuited auxiliary brush circuit which is a characteristic of such machines, it may be seen that improvements in brush holders which will permit adjustment of the holder to maintain the electrical center of brush contact in the proper position as the commutator wears, and which also permit the use of a single design of holder and support means with a number of different commutator sizes, while still maintaining the correct electrical center of brush contact, are indeed an important advancement in the art.

It is, therefore, generally an object of our invention to provide a brush holder for a dynamo-electric machine which shall be of simple construction, economical to manufacture and install, and durable and efficient in use.

More specifically it is an object of our invention to provide a unitary type reaction brush holder and support member for a dynamo-electric machine, which will require a minimum of machining operations thereon and which may be readily installed and adjusted.

A further object of our invention is to provide a brush holder for a dynamo-electric machine which may be manufactured by a single forging operation so that a plurality of brushes may be maintained in accurate alignment.

Another object of our invention is to provide a unitary brush holder for a dynamo-electric machine wherein an open brush-bearing face and an end plate having support means integral therewith may be formed in a desired fixed relation.

Still another object of our invention is to provide a brush holder and support assembly of simple design for accommodating brushes of varying thickness wherein a plurality of brushes may be aligned against a single common bearing face and the holder may be readily alined by cooperation of a brush holder support plate and guide members with a support ring.

A still further object of our invention is to provide a multiple brush holder device having a single common brush-bearing face and a holder support plate, with guide means for alining the holder, forged at substantially right angles to each other.

For a more complete understanding of the nature and scope of our invention, reference may be had to the following detailed description taken in connection with the accompanying drawings, in which:

Figure 1 is a front view in elevation of a brush holder embodying a preferred form of our invention;

Fig. 2 is a sectional view taken along the line II—II of Fig. 1;

Fig. 3 is a front view in elevation of the holder of Fig. 1 complete with brushes in position;

Fig. 4 is an end view of the brush holder of Fig. 3;

Fig. 5 is a rear view in elevation of an alternate form of brush holder;

Fig. 6 is an end view of the holder of Fig. 5;

Fig. 7 shows a preferred form of brush holder and support ring assembly; and

Fig. 8 is a part view of the brush holder and support ring assembly taken along the line VIII—VIII of Fig. 7.

Referring generally to Figure 1, it may be seen that the reference numeral 10 denotes a preferred form of brush holder as made in accordance with our invention, having a body member 12 provided with an open brush-bearing face 14 and an end support plate 16 in predetermined relation to each other. Means for mounting the holder 10 may, as shown, comprise a threaded stud member 18 and a guide member 19, preferably formed integrally with the support plate 16.

Referring more particularly to Figs. 1 through 4 of the drawings, it may be seen that the body member 12 may have a V-shaped cross-section with an upstanding front portion 20 and back portion 21. The outer face of the front portion 20, which forms the open brush-bearing face 14, may be provided with raised end projections 22 which are disposed to prevent lateral movement of the brushes 23 along the face of the holder. Slots 24 may be provided in the upper edge of the front portion 20, while corresponding slots 25 are provided in the back portion 21 of the brush holder body member for accommodating brush biasing means which may be of any well known type, comprising, for example, finger members 28 and their corresponding tension springs 29. In order to support the brush biasing means 28 and tension springs 29, a longitudinal opening 30 may be provided through the upstanding tongue portions 31 of the back portion 21 of the body member, and a common support pin 32 inserted therein.

It may be noted that the brushes 23 are provided with sloping faces 38 at their upper ends against which the finger members 28 are biased by means of the tension springs 29. In this manner the finger members 28 not only urge the brushes 23 across the bearing face 14 toward the commutator or collector ring 39, but they also function to maintain the brushes 23 in close engagement with the bearing face 14 of the holder, thus securing alignment of all the brushes against a common bearing face. Shunt members 40 may be provided in connection with the brushes 23 in any manner well known in the art and secured in contact with the body member 12 of the brush holder, such as by means of screws 42 for providing good electrical contact between the brush 23 and the body member 12 of the holder. A connector lug 44 may be provided integral with the body of the holder to facilitate current connections thereto as, for example, the connecting cable 45 of Fig. 7.

Figs. 5 and 6 illustrate an alternate form of our invention wherein the body member 50 of the brush holder may, for example, comprise merely a plate member 51 having a brush-bearing face 14, and an end support plate 16 integrally formed therewith. Support means such as the stud 18 and guide 19 may, as in the preferred form of our invention, be formed integral with the support plate 16 in a forging operation. Brush biasing means may be provided comprising, for example, a plurality of spring members 53 disposed in spaced relation on a support pin 54, being separated by an interposed sleeve 56 and maintained in operating position by means of a cotter pin 58. The support pin 54 may be an integral part of the holder or may be secured in relation thereto by virtue of a press fit in an opening 59 therein, or by any other desirable construction. As herein shown, the spring members 53 may be of the coiled clock-spring type, being coiled about the support pin 54 with one tip thereof inserted in a longitudinal slot 60 in the pin. The free end of the spring may then be disposed for engagement with a brush 23 to urge it against the brush bearing face 14 and against the commutator 39. End projections 22 may, as in the preferred form of brush holder, be provided for preventing axial movement of the brushes along the brush bearing face 14, and shunts may be provided for securing good electrical connection between the brush and the holder, while a threaded connector member 62 provides for making external electrical connection to the holder.

Referring to Figs. 7 and 8 of the drawings, it may be seen that in practicing our invention, the brush holder 10 may be mounted in a dynamo-electric machine by the use of a support ring 70, which is provided with guide grooves 72 and slotted openings 74 in association therewith. Referring to Fig. 8, it may be seen that the guide member 19 of the holder 10 may be positioned in the groove 72, and the support plate 16 of the holder may be drawn into close engagement with the face of the support ring by tightening a nut 75 on the support stud 18 which is inserted in the slot 74. In order to position the support ring 70 in a dynamo-electric machine, mounting holes 76 may be provided in the ring for engagement with support members of any desirable nature, thus providing a unitary brush holder assembly which may be easily and accurately positioned in the machine, and may be used with different sizes of machines by adjustment of the brush holders on the ring.

Since the position of the center of contact of a brush with the commutator is a critical factor in the operation of dynamo-electric machines of the cross-field type with which our invention is primarily adapted to be practiced, the groove 72 and slots 74 may be located as shown in Fig. 7 being offset from the center line of the brush, but parallel thereto. In this manner adjustment of the brush holder may be effected relative to the commutator surface for compensating for commutator wear without shifting the position of the electrical center of brush contact on the commutator. This result may not be readily effected in brush holder designs wherein the brush is located at some distance from the support stud and adjustment of the holder is about the stud. It may furthermore be realized that with reaction type brush holders of the design as used in our invention, where the brush must necessarily be inclined at an angle to the surface of the commutator in order to permit the operation of such a type of brush holder wherein the brush is not enclosed on all sides, any excessive movement of the brush relative to the holder, as would occur with wear of the commutator, would result in a shift of the center of brush contact on the commutator. It is, therefore, essential to provide for adjustment of the holder itself along an axis which is not radial but is offset so as to maintain the center of brush contact on the desired radial centerline as the commutator wears.

By utilizing our design of unitary brush holder which is simple in construction, we have found that it is possible to manufacture such a brush holder by a forging operation whereby the brush-bearing face 14 and the end support 16 face may be formed with sufficient accuracy in a single operation so as to require no subsequent expensive machining in order to secure the required smoothness of surfaces for satisfactory operation. In this manner, a brass or bronze brush holder may be readily formed in a commercial manufacturing operation such as by forging, permitting production in large quantities without involving any of the difficulties heretofore encountered in the manufacture of brush holders. Inasmuch as brush holders of such materials, which not only have the necessary conductivity and mechanical strength, but are also highly corrosion-resistant, could not heretofore be readily manufactured by mass production methods, owing to the expensive preforming, broaching or other machining operations necessary to produce the required degree of accuracy in dimensions and smoothness of surface, it must be realized that we have by our invention made a valuable and practical advancement in the art of brush holder devices.

Since certain changes may be made in the above construction, and different embodiments may be made without departing from the scope thereof, it is intended that all the matter contained in the above description, or shown in the accompanying drawings, shall be considered as illustrative and not in a limiting sense.

We claim as our invention:

1. The combination in a brush holder device for a dynamo-electric machine, of a body member having an open brush-bearing face and an end face having an integral support stud, and a support ring cooperative with said end face and support stud for positioning the holder in the machine.

2. In a brush holder device, in combination, a main body member having a brush-bearing face and a holder aligning face in predetermined relation, a support stud integral with the aligning face, a slotted support ring, and guide means integral with the aligning face cooperative with a slot in the support ring to permit adjustment of the holder.

3. In a brush holder, the combination of a forged body member having an open brush-bearing face and a holder aligning face disposed substantially at right angles thereto, resilient means for maintaining a brush in engagement with the bearing face and biasing it against a current conducting member, and means including a stud integral with the aligning face for positioning the holder.

4. A brush holder comprising a body member having a brush-bearing face and an end face in fixed relation, means for resiliently urging a brush against and along the bearing face, and means including an integral stud member cooperative with the end face for supporting the holder in predetermined alignment.

5. A brush holder for dynamo-electric machines, comprising, in combination, a forged body member having a brush-bearing surface and an end face forged in predetermined relation with said brush-bearing surface, resilient means for urging a brush against and along the bearing surface, and means including an integral stud member cooperative with the end face of the body member for supporting the holder in predetermined alignment.

6. A brush holder assembly for a dynamo-electric machine comprising, an insulated support ring, a brush holder body member having a brush-bearing face and a brush holder aligning end face formed substantially at right angles thereto, resilient means for biasing a brush against the bearing face and urging it longitudinally to contact a moving conductor surface, means for securing the brush holder end face against the support ring, and a guide member associated with the end face to align the holder.

7. In a reaction type brush holder for dynamo-electric machines, in combination, a body member having an open brush-bearing surface for aligning a plurality of brushes and a holder end face, resiliently biased members for urging the brushes against and along the brush-bearing surface, and a stud member integral with the end face for mounting the holder about an axis within the area of brush contact.

8. The combination in a brush holder, of a body member having an open brush-bearing face and a holder end face disposed in predetermined relation, means for limiting axial motion of a brush across the bearing face, means for resiliently urging a brush against and along the bearing face, and means associated with the end face for aligning the holder and mounting it about an axis substantially within the body member.

9. In a reaction type brush holder, in combination, a body member having an open bearing surface for aligning a plurality of brush members, end projections disposed to limit axial movement of the brushes, a common support pin for a plurality of individual resiliently-biased finger members for engaging an end of a brush member to bias it against the bearing surface and into engagement with a movable conductor, a support surface having a fixed relation with the bearing surface for aligning the holder, and support means integral with the support surface for positioning the holder.

10. The combination in a brush holder device for a dynamo-electric machine, of a body member having a brush-bearing face and a holder aligning face in predetermined fixed relation, means for urging a brush against the bearing face and against a commutator surface, an integral support member and a guide member cooperative with the surface of the aligning face for positioning the holder, and means including a support ring cooperative with the support member and guide member for positioning the holder and permitting adjustment of the holder to compensate for commutator wear without altering the position of brush contact with the commutator.

11. In combination with a dynamo-electric machine, a brush holder of the reaction type having a body member with a brush-bearing face and an end face in definite relation, guide means integral with the support face, a support ring adapted to cooperate with the guide means and support face to position the holder bearing face in predetermined angular relation with a commutator surface, and means for securing the holder to the support ring.

THEODORE C. FOCKLER.
ALBERT MARTENS.